Figure 1:
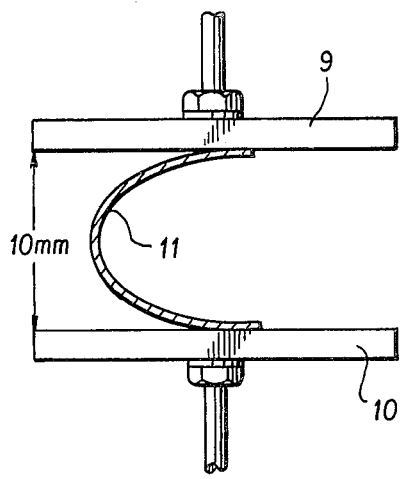

United States Patent [19]

Ichikawa et al.

[11] 4,419,399
[45] Dec. 6, 1983

[54] TRANSPARENT CONDUCTIVE FILM

[75] Inventors: Rinjiro Ichikawa; Chiyoji Hitomi, both of Otsu, Japan

[73] Assignee: Toyo Boseki Kabushiki Kaisha, Osaka, Japan

[21] Appl. No.: 280,492

[22] Filed: Jul. 6, 1981

[51] Int. Cl.³ .......................... B32B 7/02; B32B 27/38
[52] U.S. Cl. .................................. 428/215; 350/337; 350/370; 427/124; 427/163; 428/1; 428/411; 428/412; 428/413; 428/418; 428/419; 428/425.8; 428/520; 428/522; 428/702; 428/336; 428/216
[58] Field of Search ................. 428/1, 418, 419, 425.8, 428/413, 410, 411, 412, 520, 522, 702, 336; 350/337, 370; 427/163, 124

[56] References Cited

U.S. PATENT DOCUMENTS

| | | | |
|---|---|---|---|
| 3,388,036 | 6/1968 | Alampi | 428/418 |
| 3,740,254 | 6/1973 | Lansbury | 428/425.8 |
| 3,771,973 | 11/1973 | Miller | 428/425.8 |
| 3,978,252 | 8/1976 | Lombardo | 428/418 |
| 4,109,052 | 8/1978 | Anderson | 427/124 |
| 4,269,897 | 5/1981 | Gans | 428/419 |
| 4,340,624 | 7/1982 | Yamashita | 428/1 |
| 4,345,000 | 8/1982 | Kawazoe | 427/124 |

*Primary Examiner*—Ellis P. Robinson
*Attorney, Agent, or Firm*—Oblon, Fisher, Spivak, McClelland & Maier

[57] ABSTRACT

A transparent conductive film comprising a synthetic resin film or sheet, particularly a phenoxyether type polymeric supporting film or sheet, having on one surface thereof a transparent conductive layer laminated by means of vacuume metal evaporation or the like, said film or sheet meeting certain requirements with respect to retardation value, heat distortion temperature, average visible light transmittance, water vapor permeability, Izod impact strength and degree of swelling in solvents.

9 Claims, 2 Drawing Figures

TRANSPARENT CONDUCTIVE FILM

This invention relates to a film or sheet (a term "film" is representatively used hereinafter) and conductivity. More particularly, it relates to a transparent conductive film suitable for use in liquid crystal display devices.

A conventional transparent conductive plate for use in liquid crystal display devices is made of a glass substrate the surface of which has been made transparent and conductive. The recent trend is to decrease the size, weight and manufacting cost of a liquid crystal display device. However, a conventional transparent conductive plate comprised of a glass substrate has a lot of limits in reducing the thickness. The reduction in thickness of this sort of substrate is restricted by the decrease in strength of the glass sheet and many difficulties arised from a manufacturing viewpoint. In addition, it is impractical to produce a continuous long sheet from a technical or economical viewpoint, though it is supposed that the production system of such a continuous long sheet would result in a remarkable reduction in manufacturing cost. In order to overcome such prior art disadvantages, it has been proposed to use in place of the glass plate a biaxially oriented polyethylene terephthalate film as a substrate. However, since such a film is oriented and is crystalline, it has optical anisotropy. Therefore, when this sort of film is assembled into a liquid crystal display device utilizing a light polarizer, especially when it is assembled into a liquid crystal display device of the field-effect twist nematic system, the element inevitably has a fatal defect in that the angle of visual field is extremely small. It is essentially required that a substrate of a transparent conductive film is optically isotropic like a glass substrate. Other properties which are required to a substrate of a transparent conductive film for use in liquid crystal display devices include dimensional thermal stability, chemical stability, e.g., resistance to organic chemicals, liquid crystals etc.; water vapor barrier properties, light-resistance and so on. The thermal stability is crucial in providing the substrate with a transparent conductive layer. The chemical stabilities are also crucial in fabricating a display pattern. Thus, a substrate is desired to have not only transparency, optical isotropy, heat-resistance, chemical stabilities, water vapor barrier properties and light-resistance, all of which are characteristics of a glass sheet, but also flexibility and mechanical properties which are characteristics of a plastic film. Conventional plastic films have the following problems:

(1) Polycarbonate films:

The resistance to chemicals of this type of material is not good. It is difficult to provide it in the form of a thin film. In addition, this material is brittle.

(2) Unoriented polyethylene terephthalate films:

This type of film has relatively improved flexibility, but its transparency is markedly decreased.

(3) Polystyrene films:

This material is brittle and has an extremely low flexibility. Therefore, it is difficult to provide it in the form of a thin film. It is also difficult to provide a transparent conductive layer thereon.

(4) Polymethyl methacrylate films:

Transparency of this film is satisfactory, but this material is brittle and has low flexibility. In addition, the heat resistance is not good so that there are the same difficulties as found in the case of polystyrene films.

(5) Cellulose films:

Chemical stability and heat-resistance are not good. The resulting film has problems with respect to strength of the film.

(6) Cured epoxy films:

This material is brittle and has extremely low flexibility.

(7) Cured acrylic films:

This material has problems which the cured epoxy films mentioned above have.

The inventors of this invention have intensively carried out researches to provide a new type transparent conductive film particularly suitable for use in liquid crystal display devices, said transparent conduct film being able to solve the problems mentioned above and meet the above-mentioned requirements.

Thus, the primary object of this invention is to provide a transparent conductive film having satisfactory chemical stability, water vapor barrier properties, light-resistance, optical isotropy, heat-resistance, flexibility and mechanical properties.

Another object of this invention is to provide a transparent conductive film which will be useful for reducing the thickness of a liquid crystal display panel into which the transparent conductive film has been assembled.

Still another object of this invention is to provide a transparent conductive film to be assembled into a large size display panel which has a wide visual angle, provides a clear image and is light in weight.

Other objects of the invention will be apparent from the following explanation of this invention.

These and other objects of this invention have been achieved by employing the following structure of a transparent conductive film.

Thus, this invention provides a transparent conductive film comprising a film- or sheet-like supporting substrate having a transparent conductive layer formed on one surface of the substrate wherein the substrate has a retardation value of not more than 30 m$\mu$, a heat distortion temperature of not lower than 80° C., an average visible light transmittance of not less than 75%, a water vapor transmission of not higher than 30 g/24 hr·m$^2$ and an Izod impact strength of not less than 1.5 kg·cm/cm and a degree of swelling on a surface in a solvent is formed on is not more than 0.5% under the solvent resistance test hereotoafter.

Figure 2:
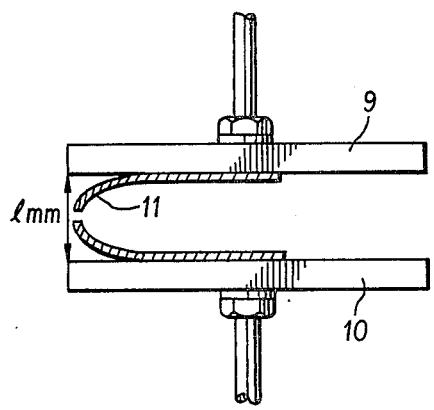

Each of FIGS. 1 and 2 is a side elevational view showing the procedure of a flexibility test.

The above-mentioned substrate or base film should be transparent and substantially optically isotropic and have a retardation value (R-value) of not more than 30 m$\mu$. The R-value is expressed as the product of the thickness (d) of a film and the absolute value of the differences between the refractive indices ($n_1$) and ($n_2$) in any two directions within the planes of said film which are perpendicular to each other, that is, $$R = d|n_1 - n_2|$$

wherein $n_1$ is the refractive index in any direction and $n_2$ is that in the direction perpendicular to the above direction.

If the R-value exceeds 30 m$\mu$, the readability of the liquid crystal display device is decreased because the proper visual angle of the film as a panel becomes narrow and interference fringes are generated.

The base film should also possess an excellent thermal dimensional stability and the heat distortion temperature thereof must be not lower than 80° C., preferably at least 130° C. When the film has a heat distortion temperature of lower than 80° C., it has a disadvantage in that it undergoes a heat distortion in the subsequent stages of forming a conductive layer by means of vacuume metal evaporation or the like and forming a cured layer which is provided, if necessary.

The base film should have an average visible light transmittance of not less than 75%, preferably at least 80%. When the average visible light transmittance is lower than 80%, then the display performance of the film is significantly impaired. The base film should also have a water vapor permeability of not higher than 30 g/24 hr·m², preferably not higher than 10 g/24 hr·m² at 22.8° C. When the water vapor permeability is higher than 30 g/24 hr·m², moisture may penetrate into the liquid crystal cell which results in a deterioration of a liquid crystal cell and adversely affects the display performance. The Izod impact strength of the base film must be not lower than 1.5 kg·cm/cm, preferably at least 2.0 kg·cm/cm at 22.8° C. A base film having an Izod impact strength of lower than 1.5 kg·cm/cm exhibits such a poor workability during cell assembling process including punching that it is damaged or broken down. The chemical stability of the film on the side on which the transparent conductive layer is formed should be such that the degree of swelling is not more than 0.5%, preferably not more than 0.05% as measured according to the test-method mentioned below. When the degree of swelling exceeds 0.5%, then the base film loses its chemical stability, resulting in a breakdown of the base film during liquid crystal cell assembling process or after encapsulation of the liquid cell. A degree of swelling of not more than 0.05% brings about a further improvement in the chemical stability.

Polymers that satisfy the above requirements should be amorphous, because crystalinity reduces a transparent property and exhibits an optical anistrope that make R value higher. All the resins that satisfy these requirements could be employed in the present invention, however, considering from the application to the present invention, resins having such chemical stabilities as resistance to organic chemicals and to liquid crystals are desirable. In the polymers that can be used in the present invention, one having excellent chemical stabilities (Group A) described above could be employed without modification, and the other having poor chemical stabilities (Group B) could be used after covering with cured film layers.

Examples of Group A are 4-methylpentene-1 polymers, acrylonitrile polymers, phenoxyether polymers, cross-linked phenoxyether polymers, cellulose esters and vynyl polymers. But in these resins in Group A, cellulose esters and vinyl polymers have some degree of problems as to water vapor permeability and heat resistance, they may be classed into Group B.

The most desirable polymer for the present invention is a phenoxyether polymer having more than 20 of the units and not less than 50 weight percent of the formula:

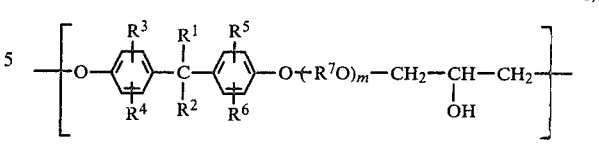

(wherein $R^1$ to $R^6$ are alkyl groups containing 1 to 3 carbon atoms, $R^7$ is an alkylene group containing 2 to 4 carbon atoms and m is an integer of 0 to 3.)
or a cross-linked phenoxy ether polymer cross-linked by the reaction of active hydrogen groups of a phenoxyether polymer having the above repeating units or a mixture thereof and other polymers with a polyfunctional compounds.

In the above formula, $R^1$ to $R^6$ are hydrogen and alkyl groups having 1 to 3 carbon atoms. Examples are such saturated alkyls as methyl, ethyl, isopropyl and so on. $R^7$ is an alkylene group having 2 to 4 carbon atoms. Examples are ethylene, propylene, trimethylene and butylene.

In the polymers discribed in the above formula I, the most preferable is a polymer of formula:

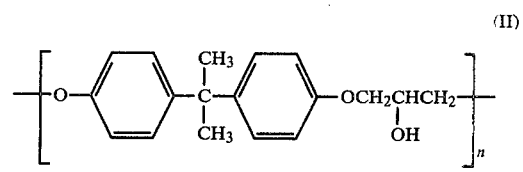

(wherein n is an integer of 50 to 800)

Phenoxy ether polymers described above are well-known polymers that are obtained through condensation reaction between epichlorohydrin and bisphenol A or its derivatives of the formula:

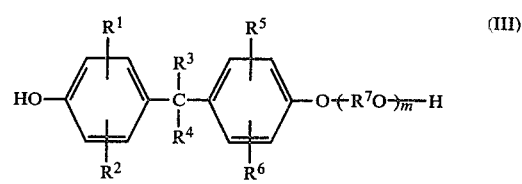

(wherein $R^1$ to $R^7$ are same as in formula (I).)

The polyfunctional compounds of this invention include compounds containing two or more (which may be the same or different) groups highly reactive to hydroxy, such as isocyanate group, carboxy group, active groups derived from carboxy group (e.g. halides, active amides, active esters, acid anhydrides, etc.) and mercapto groups. Suitable examples are such isocyanates as tolylenediisocyanate, m-phenylenediisocyanate, p-phenylenediisocyanate, 4,4'-diphenylmethanediisocyanate, etc.; such blocked polyisocyanates as phenol blocked tolylenediisocyanate, etc.: such polycarboxylic acids as adipic acid, tartaric acid, sebacic acid, phthalic acid, etc.; reactive derivatives from carboxyl groups thereof; such mercapto substituted organic carboxylic acids as thioglycolic acid, etc.; and epichlorhydrin; sodium thiosulfate; melamine-formaldehyde; phenol resins; urea-formaldehyde resins; and the like.

The polymers blended into the phenoxyether polymers of the present invention are not limited, only if the sheet or film made from the mixture is transparent.

Examples are epoxy resins (Epotohte ®YD-128, YD-011, produced by Tohto Kasei Co., Ltd.) phenol resins (Hitanol ®4010 produced by Hitachi Chemical Co., Ltd.) urea resins (Melan ®11, produced by Hitachi Chemical Co., Ltd.), melamine resins (Uban ®20SE-60 produced by Mitsui Toatsu Chemicals, Inc.), xylene resins (Nikanol ® produced by Mitsubishi Gas Chemical Co., Ltd.), acrylate resins (Elmatex ®749-7 produced by Mitsui Toatsu Chemicals Inc.) saturated polyester resins (Vilon ® 200, 103 produced by Toyobo Co., Ltd.), and the like. Examples of resins in Group B are styrenic copolymers, polycarbonates, polysulfones, polyether sulfons, polyallylene esters, etc. Films and sheets are obtained from these synthetic resins by drying, coagurating or melt-extruding methods.

The drying method is most suitable in view of an optical isotrope of the obtained film. The thickness of the film is usually from 5 to 1000 $\mu$m, preferably from 20 to 200 $\mu$m. If the thickness is less than 5 $\mu$m, it is difficult to laminate the sheet on the light-polarizing film. If the thickness exceeds 1000 $\mu$m, winding up of the sheet is difficult and an efficient production by utilizing an endless sheet is not realized. The rolled sheet may result in curled or bent panels.

When a resin in Group B is employed, at least one surface of the sheet is coated or impregnated with a curable synthetic resin and/or a monomer that is cured to give a laminated film with a practically optically isotropic. These treatments make the sheet resistant to organic chemicals and liquid crystals. Moreover the heat resistance, water vapor permeability and bondability to a conductive layer are improved. Therefore, such treatments as described above could also be applied on a sheet made from a resin in Group A. The curing resins and/or monomers used in the present invention are unsaturated monomers and/or prepolymers thereof. Examples are epoxy resins, melamine resins, acrylate resins, phenoxyether polymers, urea resins, phenolic resins, urethane resins, unsaturated polyester resins, etc. These resins can be applied, if necessary, with solvents, reaction initiators, catalysts, uv absorbers, other stabilizers, etc. The application methods are any of usual spray coating, gravure coating, reverse coating, kiss coating, Meyerbar coating, air-knife coating, dip coating, etc. Heating (commonly at 80° C. to 200° C. for 10 seconds to 1 hour), or irradiation with active light (commonly uv light of wave length from 200 to B 400 m$\mu$) or other electromagnetic radiation (electron rays, $\gamma$-rays, etc.) can be employed for curing. The thickness of the curing layer of the present invention formed at least on one surface of the amorphous synthetic resin of the present invention is from 1 $\mu$m to 10 $\mu$m, preferably from 2 $\mu$m to 5 $\mu$m. This layer can be penetrated into the amorphous resin layer or can be bonded chemically. When the thickness of the curing layer is less than 1 $\mu$m, chemical resistance, liquid crystal resistance, water vapor permeability and heat resistance are not sufficiently high. A curing layer of more than 10 $\mu$m thickness is not desirable in terms of flexibility and bondability. The laminated film with a curing layer is substantially optically isotropic.

The curing resins applied by coating or impregnation are described by way of example. First, the preferable acrylate resins are polyfunctional unsaturated monomers and/or radically produced oligomers thereof whose main components are such a compound as having at least three acryloyloxy groups and/or methacryloyloxy groups within the molecule. Especially desirable are compositions of unsaturated monomers or/and their radically polymerized oligomers, said compositions containing, based on total unsaturated monomers at least 50 weight %, preferably 70 weight %, and most desirably 90% or more of a polyfunctional unsaturated monomer containing at least 3(metha)acryloyloxy groups.

Examples of said polyfunctional unsaturated monomers having at least three acryloyloxy groups are pentaerythiritol tetramethacrylate, trimethylolpropane trimethacrylate, dipentaerythritol tetramethacrylate.

Preferred examples of bifunctional monomers are those having residual group of less than 100 carbon atoms between two acryloyloxy groups, e.g. hydrocarbon residue, polyether residue or polyester residue. Examples thereof include ethyleneglycol dimethacrylate, 1,4-butanediol dimethacrylate, polyethylene glycol dimethacrylate, and the like. Examples of monofunctional monomer include 2-hydroxymethyl methacrylate, and the like. To increase the smoothness of the coated layer after curing, a small amount of a photopolymerization initiator and/or a radical initiator is added to the unsaturated monomer and the radical polymerization is conducted at an ambient temperature to 100° C. (preferably under 50° C.). This reaction is conducted under an inert as, and it is terminated before gelation by blowing an oxygen-containing gas. The suitable solvents are such ketones as methylethylketone and ethers as methylcellosolve.

As curing catalysts, usually a photopolymerization initiator and/or a radical initiator are added in the proportion of 0.01 to 10 weight %, preferably 0.1 to 5 weight % based on the total unsaturated monomers and/or radically produced oligomers thereof to increase the curing efficiency. Examples of photopolymerization initiators include such benzoin compounds (e.g., benzoin ethyl ether), benzophenones, (e.g., p-chlorobenzophenone), naphthoquinones, anthraquinones, etc. Examples of radical initiators are peroxides such as 2,4-dichlorobenzoyl peroxide, lauroyl peroxids, benzoyl peroxide etc., and azo compounds such as azobisisobutyronitrile, etc.

Secondly, the preferable cross-linked phenoxyether resins used to coat on or penetrate into resins in Group B are the same type of resins as described in the production of the sheet or film in the present invention.

Thirdly, the preferable epoxy polymers coated on or penetrated into the polymers in Group B are glycidylether of such aromatic phenols as 2,2'-bis(p-hydroxy)phenylpropane, 2,2'-bis(4-hydroxy-3,5-dibromophenyl)propane, 1,1,2,2-tetrakis(p-hydroxyphenyl)ethane, resorcin, hydroquinone, etc; glycidylethers of phenol novolacs; cresol novolacs etc.; such alicyclic epoxy resins as vinylcyclohexene diepoxide, dicyclopentadiene diepoxide, (3',4'-epoxycyclohexylmethyl)-3,4-epoxycyclohexanecarboxylate, 3-(glycidyloxylethoxyethyl)-2,4-dioxaspiro(5,5)-8,9-epoxyundecane, etc.; such heterocyclic epoxy resins as triglycidyl isocyanurate; N,N-diglycidyl derivatives of 5,5-dimethylhydantoin, etc., such alkyl epoxy resins as ethylene glycol diglycidyl ether, propylene glycol diglycidyl ether, neopentylglycol diglycidyl ether, glycerin diglycidyl ether, etc.; and such cycloalkyl epoxy resins as hydrogenated bisphenol A diglycidylether, etc.

The examples of curing agent used along with the above described epoxy resins include such alkylamines as diethylenetriamine, triethylenetetramine, m-xylylenediamine, diethylaminopropylamine, etc., with which are used hydroxy containing compounds such as phenol, bisphenol A, phenol resins as a catalyst; such aromatic amines as methaphenylenediamine, diaminodiphenylsulfone, 4,4'-methylenedianiline, etc., with which are used phenol, boron trifluoride complex, etc. as a catalyst; such secondary and tertiary amines as benzyldimethylamine, dimethylaminomethylphenol, N-methylpiperazine, etc.; such acid anhydrides as maleic anhydride, phthalic anhydride, etc.; polyamide resins; polysulfide resins; such boron-amine complexes as boron-trifluoride-monomethylamine complex; novolac resin; 2-ethyl-4-methylimidazle; 2-(2-dimethylaminoethoxy)-4-methyl-1,3,2-dioxabornane; and the like.

Other resins having good compatibility with epoxy resins can be blended. Examples of these resins are melamine resins (e.g. Melan ®-11 produced by Hitachi Chemicals Co., Ltd.), urea-formaldehyde resins (e.g. Uban ®10S), aniline resins, xylene resins (e.g. Nikanol ®LL), saturated polyester resins (e.g. Vilon ®200 produced by Toyobo Co., Ltd.), polyurethane resins (e.g. Millionate ®MR, Millionate ®MT produced by Nippon Polyurethane Co., Ltd.), furfural resins, polyamides, polyvinyl chloride, etc.

The film or sheet is provided on one surface thereof with a transparent conductive layer. The suitable methods to form this layer are vacuum metal evaporation, chemical depositing, spattering and spraying. The most desirable methods are vacuum metal evaporation and sputtering by which layers of metal oxides such as $SnO_2$, $In_2O_3$ and mixtures of these, and metals such as Au, Pt, Pb are formed. These layers become transparent on heating. The lately developed spattering that is operated at a precipitating speed of from 3 to 15 Å/sec. under a pressure of $3 \times 10^{-5}$ to $5 \times 10^{-2}$ Torr gives instantaneously a transparent conductive layer having a thickness of 20 to 1000 Å without heat oxidation. The electron conductivity of thus obtained transparent conductive layer is from 0.1 to 5 k$\Omega$/cm$^2$ nd its visible light transparency is higher than 80%.

The transparent conductive films of this invention prepared as above have many advantages and effects as outlined below.

(i) Since they have excellent chemical stability or resistance to chemicals and liquid crystals and improved water vapor barrier property, penetration of moisture into liquid crystals is controlled so that the lieftime of liquid crystal display panels can be prolonged.

(ii) The flexibility and mechanical strength of the films are so excellent that the workability during panel assembling process is greatly improved and the resulting panel is more resistant to impact or shock applied thereto for a certain reason, e.g., dropping.

(iii) A thinner panel can be obtained. Thus, the angle of visual field is increased, the display becomes more clear and the panel weight is saved. In addition, it becomes possible to prepare a large display panel.

(iv) The transparency and light resistance are superior.

The transparent conductive films of this invention can be utilized as panel materials in display devices for a watch and a desk calculator, a controller of light transmission volume, an optical shutter, a graphic display device and the like. In addition to the liquid crystal display device, they can also be utilized in various applications, for example, as electrodes for electroluminescence, as electrodes for photoconductive sensitizer, as planar heating units for laminating to windows of aircrafts, motor cars, automobiles and the like, and as light selective films for laminating to windows of sun energy collectors, greenhouses and buildings.

The measuring methods for the properties defined at the present invention are as followings.

1. Retardation value

The senarmontoconpensator attached to a polarizing microscope (made by Nippon Chikagaku Co., Ltd.) is used. The retardation value is determined with a light source of sodium.

2. Heat distortion temperature

A test piece of 5 mm×20 mm is set as free and it is stood at a certain temperature for 3 hours. The change of the length is measured. When the change is not more than 1 mm, the sample has a dimensional stability to heat.

3. Average visible light transmittance

The spectrophotometer MPS-5000 made by Shimadzu Co., Ltd. is used. The transmittance at every 5 m$\mu$ in the range of 400 m$\mu$ to 700 m$\mu$ is measured. The value is a mathematical average.

4. Water vapor permeability

Measured in accordance with JIS Z-0208.

5. Izod impact strength

Determined in accordance with ASTM D256.

6. Degree of swelling in solvents

A test piece of 30 mm in length and 5 mm in width is immersed at 70° C. For 10 hours in such solvents as cyclohexanone, toluene, ethylcellulosolve acetate, isopropyl alcohol and a biphenyl-type liquid crystal. The degree of swelling is calculated by the following equation.

$$\text{Degree of swelling (\%)} = \frac{l - l_o}{l_o} \times 100$$

where
$l_o$; sample length before immersion
$l$; sample length after immersion

7. Flexibility

As shown in FIGS. 1 and 2, a test piece (11) of 5 mm in width and 10 mm in length is set between two parallel metal plates (9, 10; 20 mm×20 mm) as being bended with a clearance of 10 mm. The test piece is flexed at 23° C. at a speed of 10 mm/min. until it fails. The critical bending length is the clearance of two metal plates when the test piece breaks.

The following examples illustrate the present invention but are not to be construed as limiting the scope thereof. In the following, all the term "parts" mean "parts by weight".

EXAMPLE 1

To dioxane (100 parts) were added a phenoxy resin (Bakelite ® phenoxy resin, Union Carbide; 15 parts) and the reaction product of tolylene diisocyanate and trimethylolpropane (16 parts) and the mixture was stirred at room temperature until dissolution is completed. The resulting solution was cast onto a glass plate and allowed to stand for 8 hours in an atmosphere at 80° C. to give a transparent film about 100 $\mu$m thick. The film was left under no tension in hot air at 90° C. for 40 hours and then heat-treated for 20 minutes in an atmosphere of 160° C. The heat-treated transparent film had moduli of rigidity (E') of $3.12\times10^{10}$ dyne/cm$^2$ and $1.07\times10^{10}$ dyne/cm$^2$ at room temperature (25° C.) and 120° C., respectively, as measured with a VIBRON type rheometer. The data of the film obtained in various tests are reported in Table 1 below.

EXAMPLE 2

The optically isotropic film obtained in Example 1 was coated with a silicone primer and dried. On the prime-coated surface of the film, a transparent conductive layer about 700 Å thick which consisted of 95% by weight of In$_2$O$_3$ and 5% by weight of SnO$_2$ was formed by the conventional spattering technique. The resulting transparent conductive film had a surface resistance of 150Ω/cm$^2$ and an average visible light transmittance of 85%. It was optically isotropric and had good chemical stability, heat resistance, water vapor barrier property and flexibility.

The transparent conductive film was assembled into a liquid crystal cell of the field-effect twist nematic (TN) type in the conventional manner. The thickness of the cell was 570 μm. A similar liquid crystal cell which was assembled using a conventional transparent conductive glass sheet had a thickness of 1.3 mm.

The former liquid crystal cell according to this invention was subjected to a dry heat resistance test at 100° C. for 150 hours and to a wet heat resistance test at 80° C. and 92% R.H. for 150 hours. After these tests, the cell exhibited its display performance at the same level as before the tests and retained the large angle of visual field.

EXAMPLE 3

The film making procedure described in Example 1 was repeated except for the use of a melamine-formaldehyde resin (Cymel ® type 245, American Cyanamid; 10 parts) and p-toluenesulfonic acid (0.15 part) instead of the reaction product of tolylene diisocyanate and trimethylolpropane, to give a uniform, transparent film about 70 μm thick. The film was heat-treated under the same conditions as in Example 1. The heat-treated uniform, transparent film had moduli of rigidity of $3.59\times10^{10}$ dyne/cm$^2$ and $9.56\times10^9$ dyne/cm$^2$ at room temperature and 120° C., respectively. The data of the film obtained in various tests are summarized in Table 1.

On one surface of the film, a transparent conductive layer was formed under the same conditions as in Example 2. The resulting transparent conductive film was optically isotropic and had good chemical stability, heat resistance, water vapor barrier property and flexibility.

The transparent conductive film was assembled into a liquid crystal cell. The cell was subjected to a dry heat resistance test at 100° C. for 150 hours and to a wet heat resistance test at 80° C. and 92% R.H. for 150 hours. After these tests, the cell exhibited its display performance at the same level as before the tests and retained the large angle of visual field.

COMPARATIVE EXAMPLE 1

A polymethyl methacrylate film about 100 μm thick was obtained by the conventional solvent casting method. The properties of the film are reported in Table 1, from which it can be seen that the film is inferior in chemical stability and flexibility.

The film was provided on one surface thereof with a transparent conductive layer under the same conditions as described in Example 2 and the transparent conductive film thus obtained was assembled into a liquid crystal cell. When the cell was subjected to a dry heating test at 70° C. for 150 hours, the base film portion having the transparent conductive layer was dissolved in the liquid crystal, resulting in the failure of display and the breakage of the cell.

COMPARATIVE EXAMPLE 2

A transparent film was prepared in the same way as in Example 1 except that the heat treatment was conducted under tension in one direction. The film had good transparency, mechanical properties and chemical resistance, but exhibited optical anisotropy.

The film was provided on one surface thereof with a transparent conductive layer in the same way as in Example 2 and then assembled into a liquid crystal cell. On testing the cell, an interference color appeared on the cell and a satisfactory display performance could not be obtained whether the display signal was on or off.

EXAMPLE 4

(a) A polysulfone resin (Udel ®, UCC; 20 g) was added 1,1,2,2-tetrachloroethane (100 ml) and the mixture was heated at 80° C. under stirring to form a solution. The solution was cast onto a glass plate and dried at 80° to 100° C. to give a transparent film 120 μm thick. The R value of the film was 5 mμ.

(b) A homogeneous solution consisting of pentaerythritol tetraacrylate (40 parts), methylcellosolve (60 parts) and benzoin ethyl ether (0.02 part) was prepared. The viscosity of the solution was 4 cps. In a nitrogen atmosphere, the solution was irradiated under vigorous stirring with UV radiation from a 400 W high pressure mercury lamp for one minute and the stirring was then continued for 18 minutes followed by the introduction of air to stop the reaction. The solution had a viscosity of 10 cps at this stage. Thereafter, benzoyl peroxide was added to the solution in an amount of 3% by weight based on the pentaerythritol tetraacrylate to prepare a coating composition.

The coating composition solution prepared as above was applied to the polysulfone film prepared in (a) above to a thickness of 10 μm using an applicator, then dried and heat-treated at 130° C. for 7 minutes to give the desired surface-cured polysulfone film. The data of this film obtained in various tests are summarized in Table 1.

EXAMPLE 5

The film obtained in Example 4 was provided on one surface thereof with a transparent conductive layer in the same way as described in Example 2. The resulting transparent conductive film which had a transparent conductive layer about 700 Å thick showed a surface resistance of 150Ω/cm$^2$ and an average visible light transmittance of 82%. The transparent conductive film was optically isotropic and had good chemical stability, heat resistance, water vapor barrier property and flexibility.

The transparent conductive film was used to assemble a liquid crystal cell. The thickness of the cell was about 570 μm. The liquid crystal cell was subjected to a dry heat resistance test at 100° C. for 150 hours and a wet heat resistance test at 80° C. and 92% R.H. for 150 hours. After these tests, the cell exerted its display performance at the same level as before the tests and retained the large angle of visual field.

EXAMPLE 6

A polyether-sulfone resin (I.C.I; 20 parts) was added 1,1,2,2-tetrachloroethane (100 parts) and the mixture was stirred at 80° C. to form a solution. The solution was cast onto a glass plate and dried at 80° to 100° C. to give a transparent film 120 μm thick. The R value of the film as an indication of its optical isotropy was 5 mμ.

The polyether-sulfone film was then coated with the phenoxy resin solution as described in Example 1 using an applicator and a doctor knife (gap: 300 μm) and dried in an atmosphere at 70° C. for 5 hours under no tension to give a transparent film 100 μm thick. The data of various properties of this film are shown in Table 1.

The film was provided on one surface thereof with a transparent conductive layer about 700 Å thick under the same conditions as in Example 2. The resulting transparent conducting film had a surface resistance of 150Ω/cm$^2$ and an average visible light transmittance of 83%. It was optically isotropic and had good chemical stability, heat resistance, water vapor barrier property and flexibility.

The transparent conductive film was used to assemble a liquid crystal cell, which had a thickness of 550 μm. The liquid crystal cell was subjected to a dry heat resistance test at 100° C. for 150 hours and to a wet heat resistance test at 90° C. and 92% R.H. for 150 hours. After these tests, the cell exerted its display performance at the same level as before the tests and retained the large angle of visible field.

EXAMPLE 7

(a) A viscous solution was prepared by stirring a mixture of m-phenylenediamine (7 parts) in an epoxy resin (Epikote 828, Shell Chemical; 50 parts) at room temperature.

(b) The dope obtained in (a) was applied to a polyether-sulfone film as prepared in Example 6 to a thickness of 5 μm using an applicator and cured by heating for one hour at 100° C. and then for one hour at 200° C. to give a transparent composite film. The data of various properties of the film are reported in Table 1.

A transparent conductive layer about 700 Å thick was formed on one surface of the film under the same conditions as in Example 2. The resulting transparent conductive film had a surface resistance of 150Ω/cm$^2$ and an average visible light transmittance of 83%. It was optically isotropic and had good chemical stability, heat resistance, water vapor barrier property and flexibility.

The transparent conductive film was used to assemble a liquid crystal cell, which had a thickness of about 500 μm. The liquid crystal cell was subjected to a dry heat resistance test at 100° C. for 150 hours and to a wet heat resistance test at 80° C. and 92% R.H. for 150 hours. After these tests, the cell exerted its display performance at the same level as before the tests and retained the large angle of visual field.

COMPARATIVE EXAMPLE 3

The dope obtained in Example 7(a) was cast onto a glass plate to a film thickness of 10 μm using an applicator and cured in the same way as in Example 7(b), i.e., by heating at 100° C. for one hour and at 200° C. for another hour. The cured film was very brittle.

A transparent conductive film formed of the above cured film on which a transparent conductive layer was formed under the same conditions as in Example 2 had so poor flexibility that it failed during the process of assembling a liquid crystal cell.

EXAMPLE 8

(a) A polyacrylate resin (UP-polymer, Unitika Ltd.; 20 parts) was added to 1,1,2,2-tetrachloroethane (100 parts) and the mixture was heated at 80° C. under stirring to form a solution, which was then cast onto a glass plate and dried at 100° C. to give a transparent film 120 μm thick. The R-value of the film as an indication of its optical isotropy was 7 mμ.

(b) The polyacrylate film prepared in (a) above was coated with the epoxy solution obtained in Example 7(a) by casting with an applicator to a thickness of 5 μm and the coating was then cured in the same way as in Example 7(b) to give a transparent composite film. The various properties of the film are given in Table 1.

A transparent conductive layer about 750 Å thick was formed on one surface of the film under the same conditions as in Example 2. The resulting transparent conductive film had a surface resistance of 150Ω/cm$^2$ and an average visible light transmittance of 80%. It was optically isotropic and had good chemical stability, heat resistance, water vapor barrier property and flexibility.

The transparent conductive film was used to assemble a liquid crystal cell, which was subjected to dry and wet heat resistance tests under the same conditions as in Example 1. After these tests, the cell exerted its display performance at the same level as before the tests and retained the large angle of visual field.

EXAMPLE 9

A phenoxy film as prepared in Example 1 was coated with the epoxy solution obtained in Example 7(a) by casting with an applicator to a thickness of 5 μm and the coating was then cured in the same way as in Example 7(b) to give a transparent composite film. The various properties of the film are given in Table 1.

A transparent conductive layer about 750 Å thick was formed on one surface of the film under the same conditions as in Example 2. The resulting transparent conductive film had a surface resistance of 150Ω/cm$^2$ and an average visible light transmittance of 83%. It was optically isotropic and had good chemical stability, heat resistance, water vapor barrier property and flexibility.

The transparent conductive film was used to assemble a liquid crystal cell, which was subjected to dry and wet heat resistance tests under the same conditions as in Example 1. After these tests, the cell exerted its display performance at the same level as before the tests and retained the large angle of visual field.

EXAMPLE 10

Following the procedure described in Example 1 except that the phenoxy resin (15 parts) was replaced by a mixture of the phenoxy resin (10 parts) and an epoxy resin (Epikote 828, Shell Chemical; 5 parts), a uniform, transparent film 80 μm thick was prepared. The various properties of the film are reported in Table 1.

Using the film as a substrate, a transparent conducting film was prepared in the same way as described in Example 2. The thickness of the resulting transparent conductive layer was about 750 Å and the transparent conductive film had a surface resistance of 150Ω/cm$^2$ and an average visible light transmittance of 79%. It was optically isotropic and had good chemical stability, heat resistance, water vapor barrier property and flexibility.

The transparent conductive film was used to assemble a liquid crystal cell, which was subjected to dry and wet heat resistance tests under the same conditions as in Example 1. After these tests, the cell exerted its display performance at the same level as before the tests and retained the large angle of visual field.

EXAMPLE 11

Hexakismethoxymethylolmelamine (84.8 parts) was reacted with 1,4-butanediol (52.5 parts) to give a prepolymer, to which ethylene glycol (1.38 parts) was then added. The mixture was dissolved in ethylcellosolve (13 parts) and p-toluenesulfonic acid (3.9 parts) was then added as a catalyst to prepare a curing solution. A melt extruded polyether-sulfone film having a thickness of 180 μm and an R-value of 12 mμ was coated with the curing solution prepared above, then dried and heat-treated at 130° C. for 10 minutes to give a transparent composite film having a cured layer 5 μm thick. The various properties of the composite film are reported in Table 1.

EXAMPLE 12

A polyacrylonitrile cast film obtained by a dry process (film thickness 150 mμ and R-value 3 mμ) was processed in the same way as described in Example 4(b) to give a composite film.

TABLE 1

| Example No. | Color | Average visible light transmittance (%) | Heat destortion temperature (°C.) | R-value (mμ) | Izod impact strength (kg·cm/cm) | Critical width at fluxural failure (mm) | Water vapor transmission (g/24 hr·m²) | Chemical stability |
|---|---|---|---|---|---|---|---|---|
| Example 1 | Colorless | 85 | 150 | 5 | 3.0 | 1 | 5 | 0.0 |
| Example 3 | Colorless | 85 | 155 | 10 | 2.0 | 3 | 5 | 0.1 |
| Comparative 1 | Colorless | — | — | — | — | 6 | — | 1.5 |
| Comparative 2 | Colorless | — | — | 60 | — | — | — | — |
| Example 4 | Colorless | 84 | 155 | 10 | 3.5 | 3 | 2 | 0.1 |
| Example 6 | Colorless | 85 | 160 | 10 | 3.5 | 1 | 1 | 0.0 |
| Example 7 | Colorless | 85 | 160 | 10 | 2.0 | 3 | 1 | 0.0 |
| Comparative 3 | Colorless | — | — | — | 0.1 | 8 | — | — |
| Example 8 | Colorless | 82 | 155 | 10 | 3.5 | 1 | 1 | 0.2 |
| Example 9 | Colorless | 86 | 150 | 5 | 3 | 2 | 2 | 0.2 |
| Example 10 | Colorless | 82 | 150 | 10 | 2.5 | 2 | 3 | 0.1 |

What is claimed is:

1. A transparent conductive film comprising a polymeric supporting substrate in the form of a film or sheet having a transparent conductive layer formed on one surface of said substrate wherein said substrate is optically isotropic, has a thickness of 5 to 1000 microns, a retardation value of not more than 30 millimicrons, a heat distortion temperature of not lower than 80° C., an average visible light transmittance of not less than 75%, a water vapor permeability of not higher than 30 g/24 hr·m², an Izod impact strength of not less than 1.5 kg·cm/cm and the degree of swelling on a surface having the transparent layer thereon of not more than 0.5% in a solvent.

2. The transparent conductive film according to claim 1, wherein said substrate has a critical width at flexural failure of not more than 5 mm.

3. The transparent conductive film according to claim 1 or 2, wherein at least one side of said substrate is cured after it is coated or impregnated with a curable synthetic resin and/or a monomer or monomer mixture, the so-formed cured layer having a thickness of from 1 to 10 microns.

4. The transparent conductive film according to claim 1 or 2, wherein said substrate is formed of a cross-linked phenoxyether polymer obtained by a cross-linking reaction between a polyfunctional compound and active hydrogen groups of a phenoxyether polymer having at least 20 units and not less than 50 weight percent of repeat units of the formula:

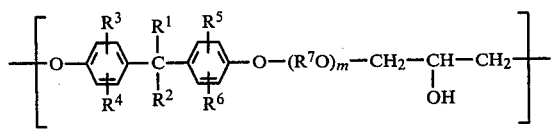

wherein $R^1$ through $R^6$ are independently hydrogen or a lower alkyl group having 1 to 3 carbon atoms, $R^7$ is a lower alkylene having 2 to 4 carbon atoms and m is an integer of 0 to 3, or a mixture consisting predominantly of said phenoxyether polymer and one or more other polymers.

5. The transparent conductive film according to claim 4, wherein said phenoxyether polymer has the formula:

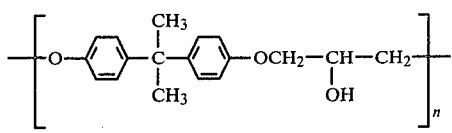

wherein n is an integer of 50 to 800.

6. The transparent conductive film according to claim 3 wherein the monomer and/or curable polymer is mainly composed of an acryloyl or methacryloyl compound containing at least 50% of a monomer having at least 3 acryloyloxy and/or methacryloyloxy groups in a molecule.

7. The transparent conductive film according to claim 3, wherein said curable synthetic resin is a mixture of polyfunctional compound and phenoxyether polymer having at least 20 units and not less than 50 weight percent of repeat units of the formula:

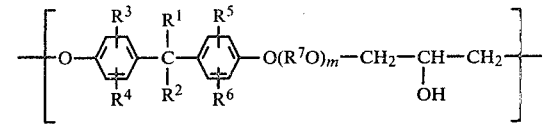

wherein $R^2$ through $R^6$ are independently hydrogen or a lower alkyl group having 1 to 3 carbon atoms, $R^7$ is a lower alkylene group having 2 to 4 carbon atoms and m is an integer of 0 to 3, or a mixture consisting predominantly of said phenoxyether polymer and one or more other polymers.

8. The transparent conductive film according to claim 3, wherein said curable syntehtic resin consists of an epoxy resin or a mixture thereof with other polymers and a curing agent.

9. The transparent conductive film according to claim 3, wherein said substrate is formed of a polymeric material selected from the group consisting of polyethersulfones, polysulfones and polyacrylates.

* * * * *